United States Patent
Klasson et al.

(10) Patent No.: US 9,784,159 B2
(45) Date of Patent: Oct. 10, 2017

(54) DEVICE AND METHOD FOR REDUCING UNWANTED EMISSIONS FROM AN ENGINE AT START OF SAID ENGINE

(71) Applicant: SCANIA CV AB, Södertälje (SE)

(72) Inventors: Martin Klasson, Södertälje (SE); Patrik Ederstål, Älvsjö (SE); Mikael Nordin, Järna (SE)

(73) Assignee: SCANIA CV AB (SE)

( * ) Notice: Subject to any disclaimer, the term of this patent is extended or adjusted under 35 U.S.C. 154(b) by 97 days.

(21) Appl. No.: 14/772,110

(22) PCT Filed: Mar. 6, 2014

(86) PCT No.: PCT/SE2014/050273
§ 371 (c)(1),
(2) Date: Sep. 2, 2015

(87) PCT Pub. No.: WO2014/137278
PCT Pub. Date: Sep. 12, 2014

(65) Prior Publication Data
US 2016/0003119 A1  Jan. 7, 2016

(30) Foreign Application Priority Data

Mar. 6, 2013 (SE) ...................................... 1350264

(51) Int. Cl.
*F01N 3/20* (2006.01)
*F02D 41/02* (2006.01)
(Continued)

(52) U.S. Cl.
CPC ........... *F01N 3/208* (2013.01); *F01N 3/2006* (2013.01); *F01N 3/2066* (2013.01); *F02D 13/04* (2013.01);
(Continued)

(58) Field of Classification Search
CPC ...... F01N 3/2006; F01N 3/2066; F01N 3/208; F01N 2610/02; F01N 2610/144;
(Continued)

(56) References Cited

U.S. PATENT DOCUMENTS 5,845,487 A * 12/1998 Fraenkle ............ B01D 53/9431
60/274
9,239,016 B2 * 1/2016 Leone ...................... F02D 9/04
(Continued)

FOREIGN PATENT DOCUMENTS

DE     44 25 018 C1     6/1995
DE     196 29 163 C1    10/1997
(Continued)

OTHER PUBLICATIONS

International Search Report dated May 27, 2014 issued in corresponding International patent application No. PCT/SE2014/050273.
(Continued)

*Primary Examiner* — Brandon Lee
(74) *Attorney, Agent, or Firm* — Ostrolenk Faber LLP (57) ABSTRACT

A method to reduce during the start of an engine undesired emissions from the engine, where an SCR catalytic converter for the cleaning of exhaust gases is arranged in an exhaust passage at the engine. The method includes controlling the dosage of fuel to the engine with a certain delay relative to what is the case during essentially optimal combustion in order to reduce the development of heat that results from the combustion of fuel through non-optimal combustion. Also a computer program product comprising program code to implement a method of reducing emissions. Also an arrangement to reduce during the start of an engine undesired emissions from the engine and a motor vehicle that is equipped with the arrangement.

15 Claims, 4 Drawing Sheets

(51) Int. Cl.
*F02D 41/06* (2006.01)
*F02D 41/40* (2006.01)
*F02D 13/04* (2006.01)

(52) U.S. Cl.
CPC ....... *F02D 41/0235* (2013.01); *F02D 41/064* (2013.01); *F02D 41/401* (2013.01); *F01N 2610/02* (2013.01); *F01N 2610/144* (2013.01); *F01N 2900/04* (2013.01); *F01N 2900/1404* (2013.01); *F01N 2900/1602* (2013.01); *F01N 2900/1621* (2013.01); *F01N 2900/1622* (2013.01); *F02D 2200/0802* (2013.01); *F02D 2250/36* (2013.01); *Y02T 10/24* (2013.01); *Y02T 10/26* (2013.01); *Y02T 10/44* (2013.01)

(58) Field of Classification Search
CPC ........ F01N 2900/04; F01N 2900/1404; F01N 2900/1602; F01N 2900/1621; F01N 2900/1622; F02D 13/04; F02D 41/0235; F02D 41/064; F02D 41/401; F02D 2200/0802; F02D 2250/36; Y02T 10/24; Y02T 10/26; Y02T 10/44
See application file for complete search history.

(56) References Cited

U.S. PATENT DOCUMENTS

| | | | |
|---|---|---|---|
| 2010/0139248 A1* | 6/2010 | Najt | F01N 3/106 60/285 |
| 2011/0005199 A1 | 1/2011 | Kammer et al. | |
| 2011/0253103 A1 | 10/2011 | Talwar et al. | |
| 2012/0004825 A1* | 1/2012 | Koch | F01N 3/2066 701/103 |

FOREIGN PATENT DOCUMENTS

| | | |
|---|---|---|
| EP | 2 149 684 A1 | 2/2010 |
| WO | WO 2010/050857 A1 | 5/2010 |

OTHER PUBLICATIONS

International Preliminary Report on Patentability dated May 28, 2015 issued in corresponding International patent application No. PCT/SE2014/050273.

* cited by examiner

DEVICE AND METHOD FOR REDUCING UNWANTED EMISSIONS FROM AN ENGINE AT START OF SAID ENGINE

CROSS-REFERENCE TO RELATED APPLICATIONS

The present application is a 35 U.S.C. §§371 national phase conversion of PCT/SE2014/050273, filed Mar. 6, 2014, which claims priority of Swedish Patent Application No. 1350264-6, filed Mar. 6, 2013, the contents of which are incorporated by reference herein. The PCT International Application was published in the English language.

TECHNICAL FIELD

The present invention concerns a method to reduce undesired emissions from an engine during the start of an engine. The invention concerns also a computer program comprising program code for a computer to implement a method according to the invention. The invention concerns also an arrangement to reduce undesired emissions from an engine during the start of an engine and a motor vehicle that is equipped with the arrangement.

BACKGROUND OF THE INVENTION

In vehicles currently available urea, for example, is used as a reducer in SCR systems (where "SCR" is an abbreviation for "selective catalytic reduction"), the system comprising an SCR catalytic converter, in which the reducer and $NO_x$ gas can react and are converted to nitrogen gas and water. Different types of reducer can be used in SCR systems. One commonly used reducer is, for example, AdBlue.

One type of SCR system includes a container that contains a reducer and a pump configured to pump the reducer from the container through a suction pipe and to supply it through a pressurised pipe to a dosage unit arranged at an exhaust system on the vehicle, for example, at an exhaust pipe at the exhaust system. The dosage unit is configured to inject a required amount of reducer into an exhaust system upstream of the SCR catalytic converter. The required component is selected according to drive routines that are stored in a control unit in the vehicle.

There is a need to reduce the amount of emissions from engines in motor vehicles. This applies not least for heavy motor vehicles such as trucks and buses, since legal requirements for ever-lower emissions are continuously being tightened.

Application of an exhaust brake at an engine of a motor vehicle during starting of the engine, such as during the cold start of the engine, is currently known, in order in this way to achieve a more rapid warming of the engine and a post-treatment system.

During the start, such as during the cold start, of a motor vehicle a yellowish or brownish smoke sometimes may initially be exhausted to the surroundings of the vehicle through an exhaust passage from the engine. The feed out of smoke may in certain circumstances continue for several minutes. This smoke is undesired for several reasons. Not only can the smoke negatively impact the environment, but it also can create a negative impression of the performance of the vehicle. Furthermore, the smoke may be harmful to health when inhaled by, for example, people.

US20120004825 describes a method for the operation of a combustion engine comprising an exhaust control system that includes an SCR catalytic converter.

US20110005199 describes a method to reduce emissions from a motor vehicle that has a combustion engine.

SUMMARY OF THE INVENTION

One purpose of the present invention is to provide a new and advantageous method to reduce undesired emissions from an engine during the start of the the engine.

A further purpose of the invention is to provide a new and advantageous arrangement and a new and advantageous computer program in order to reduce undesired emissions from an engine during the start of the engine.

A further purpose of the invention is to provide a method, an arrangement and a computer program in order to achieve the reliable start of an engine in which undesired emissions from the engine can be reduced or minimised.

A further purpose of the invention is to provide an alternative method, and alternative arrangement and an alternative computer program in order to reduce undesired emissions from the engine during the start of an engine.

These purposes are achieved with a method to reduce during the start of an engine undesired emissions from the engine.

According to one aspect of the invention, a method is disclosed to reduce undesired emissions during the start of an engine which comprises at least one cylinder with an associated piston wherein an SCR catalytic converter for the cleaning of exhaust gases is arranged in an exhaust passage in the engine. The method may comprise the following steps:

controlling the dosage of fuel to the engine; and
controlling the dosage of fuel to the engine with a certain delay relative to the dosage during essentially optimal combustion to reduce the development of heat that results from the combustion of fuel through non-optimal combustion.

The start of an engine may be a cold start. A cold start may relate to the start of the said engine when a temperature of at least one of the engine, the vehicle and its post-treatment system lies below a pre-determined temperature, for example 0 degrees Celsius or −10 degrees Celsius. A cold start of the engine may relate to the start of the engine when the engine has been switched off for a certain period of time. A cold start of the engine may relate to the start of the engine when the engine has been switched off for a certain period of time, when a temperature of the ambient air, at least during a certain period of time, has been below a pre-determined level of temperature. A cold start of the said engine may relate to the start of the engine when the engine has been switched off for a certain period of time, when a temperature of the ambient air, at least during a certain period of time, has been below a pre-determined level of temperature, and where an engine heater associated with it has warmed to engine to a certain level of temperature. A cold start of the engine may relate to the start of the engine when the engine has been switched off for a certain period of time under certain conditions of temperature, and where an engine heater associated with it has achieved a certain increase in temperature from an original lower level of temperature.

According to one aspect of the invention, the amount of $NO_x$ gas that is formed and fed out to the surroundings through an exhaust passage is reduced during a cold start of the engine. In this case, an accumulated amount of $NO_x$ gas from the engine is reduced to a minimum during an initial time period when a prevalent temperature of a flow of exhaust gases from the engine lies below a pre-determined value, such as 50 degrees Celsius.

According to one aspect of the present invention, it is advantageous during the start, such as the cold start, of an engine to achieve a reduction of NO gas from the engine. In this case, a small amount of NO gas will be supplied to and possibly also stored in the SCR catalytic converter. By supplying a dosage of fuel with a certain delay, the dosage of fuel supplied in a cylinder will be ignited later and in this way will result in a lower production of heat in the engine, whereby a smaller amount of NO gas is produced and fed out into an exhaust passage comprising the SCR catalytic converter.

According to one aspect of the present invention, during the start of an engine comprising at least one cylinder with its associated piston, a method is provided to reduce undesired emissions from the engine, where an SCR catalytic converter for the cleaning of exhaust gases is arranged in an exhaust passage at the engine, the method comprising the steps:
to control the dosage of fuel to the engine;
to control the dosage of fuel to the engine with a certain delay relative to what is the case during essentially optimal combustion in order to reduce production of NO gas that results from the combustion of fuel through non-optimal combustion.

A certain amount of stored NO gas will be released from the SCR catalytic converter in the event of a rise in temperature of the SCR catalytic converter.

A part of the stored or supplied NO gas will be converted into $NO_2$ gas at the SCR catalytic converter. In the event of a further rise in temperature, $NO_2$ gas will also be released from the SCR catalytic converter, whereby yellow or brown smoke will be emitted from the SCR catalytic converter. That smoke may comprise $NO_2$ gas.

The production of the yellow or brown smoke will cease at a temperature of the exhaust gases of approximately 50 degrees Celsius. According to one aspect of the invention, a procedure is obtained during the start, such as during the cold start, of an engine in which a minimisation of undesired smoke is obtained until a certain temperature of the exhaust gases of the engine or a temperature at the SCR catalytic converter is reached. Positive environmental effects are in this case obtained.

In the case of essentially optimal combustion, the dosage of fuel can take place to each relevant cylinder in association with a turning point of the piston of the cylinder, and whereby the dosage of fuel with a certain delay takes place when the piston in the relevant cylinder has passed the turning point.

The dosage of fuel in the case with a certain delay can take place at a pre-determined crankshaft angle. The pre-determined crankshaft angle may lie within an interval of 10-15 degrees relative to the turning point. The pre-determined crankshaft angle may be a suitable crankshaft angle.

The SCR catalytic converter may comprise a substrate of vanadium and may be what is known as a vanadium SCR catalytic converter.

The method according to the invention is particularly advantageous during the start, such as the cold start, of the engine where the engine is subsequently driven at an idling rate of revolution for a period. On the other hand, the method according to the invention is advantageous also during the start of the engine, where the engine is driven at a rate of revolution that is higher than the idling rate of revolution, during, for example, the propulsion of a vehicle.

The method may comprise the following steps:
determining the prevalent ambient temperature at the engine;
determining whether the ambient temperature lies below a certain pre-determined value, and
when the ambient temperature lies below the pre-determined value, activating the control of the dosage of fuel to the engine with a certain delay relative to what is the case during principally optimal combustion.

The method may comprise the following steps:
determining the prevalent temperature of the engine;
determining whether the engine temperature lies below a pre-determined value, and
when the engine temperature lies below the pre-determined value, activating the control of the dosage of fuel to the engine with a certain delay relative to what is the case during principally optimal combustion.

The pre-determined value, with respect to the ambient temperature and the engine temperature, may be 0 degrees Celsius. The pre-determined value may be −5 degrees Celsius. The pre-determined value may be −10 degrees Celsius. The pre-determined value may be a suitable value that lies within an interval [0, −20] degrees Celsius. The pre-determined value may be a suitable value that lies below −20 degrees Celsius, for example, −30, −40 or −50 degrees Celsius. The pre-determined value may be a suitable value that lies within an interval [0, 5] degrees Celsius. A cold start of the said engine may, thus, according to one aspect, concern the start of the engine at a temperature that exceeds 0 degrees Celsius, for example +3 degrees Celsius.

The method may comprise the following step:
activating the fuel dosage with a certain delay after a completed starting mode of the engine. The dosage during the starting mode may take place according to control routines stored in a control unit. The control routines may comprise control of the fuel dosage essentially without delay. The starting mode may be active for a time period of, for example, 5 or 15 seconds. A control unit may determine during the starting mode that at least one of the engine and other components, such as, an SCR catalytic converter associated with the engine, should function in the intended manner. In this case, a reliable cold start of an engine in which undesired emission from the engine can be reduced or minimised is achieved.

The method may comprise the step of:
determining at least one of a temperature at the SCR catalytic converter and a temperature of a flow of exhaust gases from the engine.

The method may comprise the following steps:
determining whether the temperature that has been determined at the SCR catalytic converter exceeds a pre-determined value, and the step of
determining whether the temperature of the flow of exhaust gases that has been determined exceeds a pre-determined value.

The method may comprise the following step:
deactivating the fuel dosage with a certain delay at a pre-determined temperature of at least one temperature at the SCR system. The pre-determined temperature of at least one temperature at the SCR system may concern a pre-determined temperature at the SCR catalytic converter or a pre-determined temperature of a flow of exhaust gases from the engine. The pre-determined temperature at the SCR catalytic converter may be 50 degrees Celsius. The pre-determined temperature of the flow of exhaust gases may be 50 degrees Celsius.

In this case, it may be advantageous that the method according to the invention be deactivated at a suitable time, i.e. when the risk that yellow smoke or brown smoke is emitted from the exhaust passage of the engine is low or zero.

The method may comprise the following step:
determining a prevalent degree of storage with respect to reducing agent at the SCR catalytic converter as a basis for activating the dosage of fuel with a certain delay and the control of the delay.

When the degree of storage with respect to reducing agent at the SCR catalytic converter exceeds a pre-determined value, such as, for example, 25%, the fuel dosage can be controlled essentially for optimal combustion of the dosed fuel. In this case, a user-friendly and automatic control of whether the method according to the invention is to be activated or not is advantageously achieved.

According to one aspect of the invention, by means of suitable means it can determine whether the driver is to drive the engine in a particular manner in order to increase a degree of storage of a reducing agent in the SCR catalytic converter before switching off. This may be particularly suitable when a temperature of the ambient air is below 0 degrees Celsius, or when it is expected that the ambient air will be under 0 degrees Celsius at a future start of the engine. Appropriate instructions can in this case be presented to an operator of the engine before switching off.

According to one aspect of the invention, the dosage of fuel with a certain delay can take place in the absence of an activated exhaust brake at the engine. The exhaust brake can be deactivated at initiation of the method according to the invention. The exhaust brake can be activated after the dosage with a certain delay has been ended. According to one design, the effect of the exhaust brake can increase gradually as a function of the temperature prevalent at the said SCR catalytic converter. The effect of the exhaust brake may be increased in steps or in stepless increments, on the basis of the temperature prevalent at the SCR catalytic converter. The higher the temperature prevalent at the SCR catalytic converter, the higher the effect of the exhaust brake. When the exhaust brake is activated, it increases load on the engine, whereby a temperature of the engine can be increased more rapidly than is the case when the exhaust brake is deactivated.

According to one design, the effect of the exhaust brake may be controlled on the basis of at least one temperature of the SCR system or on the basis of the prevalent degree of storage with respect to reducing agent in the SCR catalytic converter. The at least one temperature at the SCR catalytic converter may be a prevalent temperature at the SCR catalytic converter or a prevalent temperature of the exhaust gases from the engine. The higher the degree of storage in the SCR catalytic converter, the higher the effect of the exhaust brake.

The embodiment in which the method according to the invention is initially carried out in the absence of an activated exhaust brake, i.e. with a deactivated or not activated exhaust brake, leads to the amount of $NO_x$ gas, and thus also the amount of NO gas, that is produced and fed out to the surroundings through an exhaust passage during a cold start of the engine being reduced or minimised during a cold start of the engine relative to the amount during a cold start in which the exhaust brake is initially activated. An accumulated amount of $NO/NO_x$ gas from the engine can in this case be minimised during an initial period during which a prevalent temperature of a flow of exhaust gases from the engine does not exceed a pre-determined value, for example 50 degrees Celsius.

During a cold-start procedure, up to a certain temperature of the flow of exhaust gases and SCR catalytic converter, a certain amount of NO gas will be stored in the SCR catalytic converter. Within a certain interval of temperature at the SCR catalytic converter, for example 20-40 degrees Celsius, the stored NO gas will be released, whereby a certain fraction of the NO will be converted to $NO_2$ gas. Also, a certain part of the supplied NO gas will then be converted to $NO_2$ gas. In association with this, and in the event of further increase in temperature, $NO_2$ gas will be released from the SCR catalytic converter, whereby yellow or brown smoke will be emitted from the SCR catalytic converter.

At a temperature of the exhaust gases or the SCR catalytic converter of, for example, 50 degrees Celsius, the production of yellow or brown smoke will cease.

The embodiment in which the method according to the invention is initially carried out in the absence of an activated exhaust brake, i.e. with a deactivated or not activated exhaust brake, leads to the temperature increase taking place more slowly than is the case with an activated exhaust brake. The inventors of the present invention have, however, discovered that the fact that the method according to the invention is initially carried out in the absence of an activated exhaust brake results in it being possible to reduce or minimise the total amount of $NO/NO_x$ gas produced by the engine. The inventors have discovered that the embodiment results in the amount of NO stored in the SCR catalytic converter can be reduced or minimised. The inventors have discovered that the embodiment results in the emission of yellow or brown smoke from the SCR catalytic converter can be reduced or minimised.

As has been mentioned above, the production of yellow or brown smoke will cease at a temperature of the exhaust gases or of the SCR catalytic converter of, for example, 50 degrees Celsius, whereby the increase in temperature at a suitable pre-determined temperature, for example, 50 degrees Celsius, can be accelerated through the use or activation of, for example, an exhaust brake or some form of additional brake, such as, a hydraulic or electrical retarder.

The undesired emissions can relate to NO gas downstream of the engine but upstream of the SCR catalytic converter, and $NO_2$ gas downstream of the SCR catalytic converter.

The method may comprise the following step:
controlling the delay on the basis of at least one of a temperature prevalent at the SCR catalytic converter and a temperature prevalent at the exhaust gases from the engine. The higher the prevalent temperature at the SCR catalytic converter, the shorter will be the delay. The higher the prevalent temperature of the exhaust gases from the engine, the shorter will be the delay. The lower the prevalent temperature of the exhaust gases from the engine, the longer will be the delay.

According to one aspect of the present invention, the control of the dosage of fuel in the engine may return to its normal drive routines when a temperature of the exhaust gases from the engine exceeds, for example, 40 degrees Celsius.

The method is easy to implement in existing motor vehicles. Software to reduce undesired emissions from the engine during the cold start of an engine according to the invention can be installed in a control unit of the vehicle during its manufacture. A purchaser of the vehicle can thus be given the opportunity of choosing the function of the method as an optional extra. Alternatively, software comprising program code to carry out the innovative method to reduce undesired emissions from the engine during the cold start of an engine can be installed in a control unit of the vehicle during upgrading at a service station. The software in this case can be loaded into a memory in the control unit.

Software that comprises program code to reduce undesired emissions from the engine during the start, such as the cold start, of an engine can be easily updated or exchanged. Furthermore, different parts of the software that comprises program code to reduce undesired emissions from the engine during the cold start of an engine undesired emissions from the engine can be exchanged independently of each other. This modular configuration is advantageous from the point of view of maintenance.

According to one aspect of the invention, an arrangement is provided to reduce undesired emissions from the engine during the start of an engine that comprises at least one cylinder with its associated piston undesired emissions from the engine, where an SCR catalytic converter for the cleaning of exhaust gases is arranged in an exhaust passage at the engine. The start of the engine may be a cold start of the engine.

The arrangement may comprise:
means adapted to control the dosage of fuel to the engine, and
means adapted to control the dosage of fuel to the engine with a certain delay relative to essentially optimal combustion in order to reduce the heat developed as a result of the combustion of fuel through non-optimal combustion.

The dosage of fuel at the arrangement can, in the case of essentially optimal combustion, take place to the relevant cylinder in association with a turning point of the piston of the cylinder, and whereby the dosage of fuel in the case of a certain delay takes place when the piston in the relevant cylinder has passed the turning point.

The dosage of fuel may take place at the arrangement in the case of a certain delay at a pre-determined crankshaft angle.

The arrangement may comprise:
means adapted to activate the dosage of fuel with a certain delay after a starting mode of the engine has ended.

The arrangement may comprise:
means adapted to deactivate the dosage of fuel at a certain delay at a pre-determined temperature of at least one temperature at the SCR system. The pre-determined temperature of at least one temperature at the SCR system may concern a pre-determined temperature at the SCR catalytic converter or a pre-determined temperature of a flow of exhaust gases from the engine.

The arrangement may comprise:
means adapted to determine a prevalent degree of storage with respect to reducing agent at the SCR catalytic converter as a basis for the activation of dosage of fuel with a certain delay and the control of the delay.

The arrangement may comprise:
means adapted to activate and deactivate an exhaust brake at the engine,
means adapted to control the dosage of fuel with a certain delay in the absence of an activated exhaust brake.

The arrangement may comprise:
means adapted to control the delay on the basis of at least one temperature at the SCR system.

The arrangement may comprise:
means adapted to control the delay on the basis of a temperature prevalent at the SCR catalytic converter or a temperature prevalent of the said exhaust gases from the engine.

The purposes described above are achieved also with a motor vehicle that comprises the arrangement to reduce undesired emissions from the engine during the start of an engine. The motor vehicle may be a truck, a bus or a car.

According to one aspect of the invention, a computer program is provided to reduce, during the start of an engine that comprises at least one cylinder with its associated piston, undesired emissions from the engine, where the computer program comprises program code stored on a medium that can be read by a computer, in order to cause an electronic control unit or a second computer connected to the electronic control unit to carry out the steps according to the invention.

According to one aspect of the invention, a computer program is provided to reduce undesired emissions from the engine during the start of an engine that comprises at least one cylinder with its associated piston, where the computer program comprises program code in order to cause an electronic control unit or a second computer connected to the electronic control unit to carry out the steps according to the invention.

According to one aspect of the invention, a computer program product comprising program code is provided, stored on a medium that can be read by a computer, in order to carry out the method steps according to the invention, where the computer program is run on an electronic control unit or a second computer connected to the electronic control unit.

Further purposes, advantages and new distinctive features of the present invention will be made clear for one skilled in the art by the following details, as also during execution of the invention. While the invention is described below, it should be obvious that the invention is not limited to the specific details described. Those skilled in the arts will recognise further applications, modifications and executions within other fields, which lie within the scope of the invention.

BRIEF DESCRIPTION OF DRAWINGS

For a more complete understanding of the present invention and further purposes and advantages of it, reference is now made to the following detailed description that is to be read together with the accompanying drawings in which the same reference numbers relate to the same parts in the various drawings, and in which.

DETAILED DESCRIPTION OF EMBODIMENTS

Figure 1:
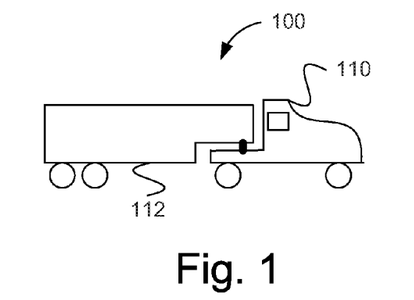
FIG. 1 illustrates schematically a vehicle, according to one embodiment of the invention.

FIG. 1 shows a side view of a vehicle 100. The vehicle 100 taken as an example comprises a drawing vehicle 110 and a trailer 112. The vehicle may be a heavy vehicle, such as a truck or a bus. Alternatively, the vehicle may be a car.

The vehicle 100 may comprise a combustion engine and an SCR system.

It should be pointed out that the invention is suitable for application in a suitable SCR system and is thus not limited to an SCR system in a motor vehicle. The innovative method and the innovative arrangement at the SCR system according to one aspect of the invention is well-suited to other platforms than motor vehicles that include an SCR system such as, water-going vessels. The water-going vessels may be of any freely chosen type such as, motor boats, vessels, ferries or ships.

It should be pointed out that the invention is suitable for application at a suitable engine and is thus not limited to a diesel engine in a motor vehicle.

The engine may be a combustion engine that can be driven by a suitable fuel. The fuel may be in liquid or gas form. Examples of fuel may be methanol, ethanol, petrol, diesel, vegetable oil such as rapeseed oil, and propane.

The innovative method and the innovative arrangement at the SCR system are, according to one aspect of the invention, suitable for use also with systems that include a rock crusher or similar.

The innovative method and the innovative arrangement at the SCR system are, according to one aspect of the invention, suitable for use also with, for example, systems that include at least one of industrial engines and motor-driven industrial robots.

The innovative method and the innovative arrangement at the SCR system are, according to one aspect of the invention, suitable for use also with, for example, various types of power station, such as electrical power stations that comprise a diesel generator.

The innovative method and the innovative arrangement at the SCR system are suitable for use also with a freely chosen suitable engine system that includes an engine and an SCR system such as, a railway engine or another platform.

The innovative method and the innovative arrangement at the SCR system are suitable for use also with a freely chosen system that includes an $NO_x$ generator and an SCR system.

In this document, the term "link" refers to a communication link that may be a physical line, such as an opto-electronic communication line, or a non-physical line, such as a wireless connection, for example a radio link or microwave link.

In this document, the term "line" refers to a passage to contain and to transport a fluid, such as, for example, a reducer in fluid form. The line may be a pipe of freely chosen dimension. The line may be of a freely chosen and suitable material, such as, for example, plastic, rubber or metal.

In this document, the terms "reductant", "reducer" and "reducing agent" refer to an agent that is used to react with certain emissions in an SCR system. These emissions may be, for example, $NO_x$ gas. The terms "reductant" and "reducing agent" are used synonymously in this document. The reducer according to one embodiment is what is known as AdBlue. Naturally, other types of reducer can be used. AdBlue is given as an example of a reducer in this document, but one skilled in the arts will realise that the innovative method and the innovative arrangement can be brought to reality for other types of reducer.

Figure 2:
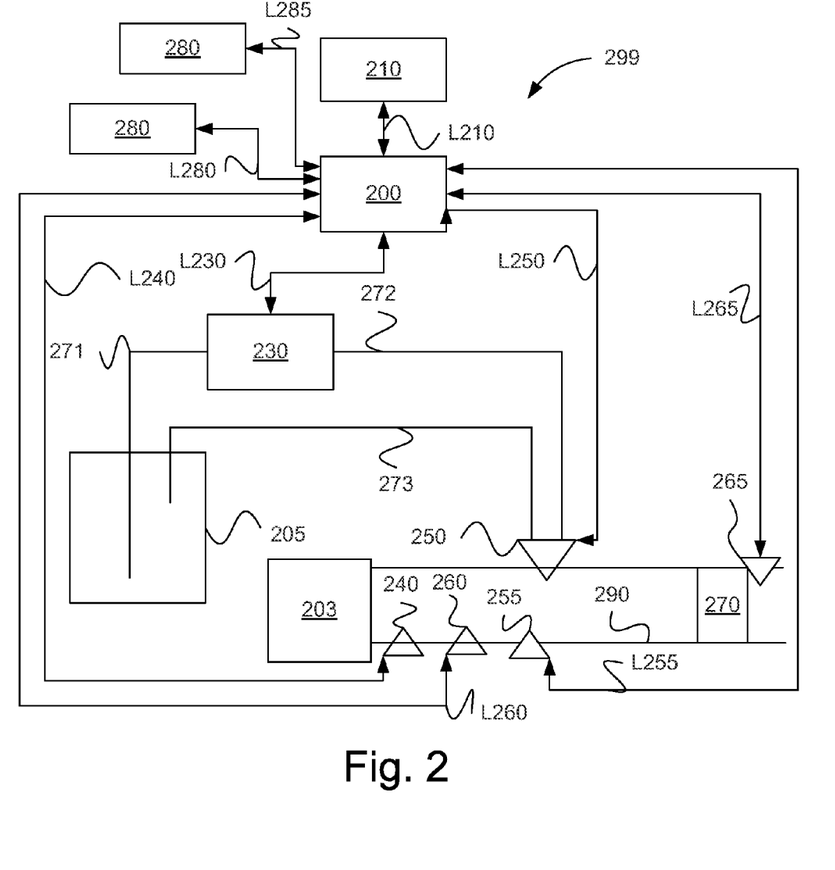
FIG. 2 illustrates schematically an arrangement for fault finding of an SCR system, according to one embodiment of the invention.

With reference to FIG. 2, there is shown an arrangement 299 at the vehicle 100. The arrangement 299 may be arranged in the drawing vehicle 110. The arrangement 299 may constitute a part of an SCR system or it may include an SCR system. The arrangement 299 comprises according to this example a container 205 that is arranged to contain a reducer. The container 205 is arranged to contain a suitable amount of reducer and is further arranged such that it can be filled when necessary.

A first line 271 is arranged to lead the reducer to a pump 230 from the container 205. The pump 230 may be a freely chosen suitable pump. The pump 230 may be a membrane pump comprising at least one filter. The pump 230 may be arranged to be driven by means of an electric motor (not shown in the drawings). The pump 230 may be arranged to pump the reducer up from the container 205 through the first line 271 and to supply the reducer through a second line 272 to a dosage unit 250. The dosage unit 250 may include an electrically controlled dosage arrangement, by means of which a flow of reducer that has been supplied to the exhaust system can be controlled. The pump 230 is arranged to place the reducer under pressure in the second line 272. The dosage unit 250 is arranged with a throttle unit, which can be referred to also as a throttle valve, against which the pressure at the reducer can be built up in the arrangement 299.

The dosage unit 250 is arranged to supply the reducer to an exhaust passage 290 at the vehicle 100. To be more precise, the dosage unit 250 is arranged to supply in a controlled manner a suitable amount of reducer to an exhaust passage 290 at the vehicle 100, according to one aspect of the method according to the invention. According to this method, an SCR catalytic converter is arranged downstream of a position at the exhaust system at which supply of reducer takes place. The amount of reducer that is supplied into the exhaust system is intended to be used in the SCR catalytic converter in order to reduce the amount of undesired emissions.

The dosage unit 250 may be arranged at the exhaust passage 290 that is arranged to lead exhaust gases from a combustion engine 203 at the vehicle 100 to the SCR catalytic converter and onwards to the surroundings of the vehicle. The first control unit 200 is arranged to control operation of the engine 203 by means of devices that are appropriate for this.

A third line 273 is arranged between the dosage unit 250 and the container 205. The third line 273 is arranged to lead back a certain amount of the reducer that has been fed to the dosage valve 250 to the container 205.

The first control unit 200 is arranged for communication with the pump 230 through a link L230. The first control unit 200 is arranged to control operation of the pump 230. According to one example, the first control unit 200 is arranged to control the pump 230 by means of an electric motor (not shown in the drawings). The first control unit 200 is arranged to influence a working pressure in the second line 272. This can take place in various suitable ways.

According to one example the first control unit 200 is arranged to change a prevalent rate of revolution, RPM, at the pump 230. The pressure can in this case be changed in the manner desired. The working pressure can be increased by increasing the rate of revolution at the pump 230. The working pressure can be decreased by decreasing the rate of revolution at the pump 230.

The first control unit 200 is arranged for communication with a first temperature sensor 240 through a link L240. The temperature sensor 240 is arranged to detect a prevalent temperature T1 of a flow of exhaust gases from the engine of the vehicle. According to one example, the first temperature sensor 240 is arranged at the exhaust passage 290 immediately downstream of the engine of the vehicle and upstream of a dosage unit 250. The temperature sensor 240 may be arranged at a suitable location at the exhaust passage 290. The first temperature sensor 240 is arranged to detect continuously a prevalent temperature T1 of the flow of exhaust gases and to send signals containing information about the prevalent temperature T1 over the link L240 to the first control unit 200.

The first control unit 200 is arranged for communication with a second temperature sensor 260 through a link L260. The second temperature sensor 260 may be arranged to detect a prevalent temperature T2 of a surface in the exhaust system at which the reducing agent is vaporised. The second temperature sensor 260 may be arranged to detect a prevalent temperature T2 at the exhaust passage 290 at a suitable location. The second temperature sensor 260 may be arranged to detect a prevalent temperature T2 at a suitable surface or component of the exhaust passage 290. According to one example, the second temperature sensor 260 is arranged at the exhaust passage 290 upstream of the dosage unit 250. According to a second example, the second temperature sensor 260 is arranged in a vaporisation unit (not shown in the drawings) or the SCR catalytic converter 270 downstream of the dosage unit 250. The second temperature sensor 260 is arranged to detect continuously a prevalent temperature T2 of a surface or a component at the exhaust passage 290 and to send signals containing information about the prevalent temperature T2 over the link L260 to the first control unit 200.

According to one design, at least one of the first control unit 200 and the second control unit 210 is arranged to calculate the first temperature T1. This can take place by means of a stored calculation model. At least one of the first control unit 200 and the second control unit 210 may be arranged to calculate the first temperature T1 on the basis of, for example, a prevalent mass flow of exhaust gases, the prevalent rate of revolution of the engine, and the prevalent load on the engine.

According to one example, at least one of the first control unit 200 and the second control unit 210 is arranged to calculate the second temperature T2. This can take place by means of a stored calculation model. At least one of the first control unit 200 and the second control unit 210 may be arranged to calculate the second temperature T2 on the basis of, for example, a prevalent mass flow of exhaust gases, the prevalent rate of revolution of the engine, and the prevalent load on the engine.

A first $NO_x$ sensor 255 is arranged for communication with the first control unit 200 over a link L255. The first $NO_x$ sensor 255 is arranged to determine continuously a prevalent $NO_x$ level in the flow of exhaust gases upstream of the SCR catalytic converter 270. According to one example, the first $NO_x$ sensor is arranged at the exhaust passage 290 upstream of the dosage unit 250. The first $NO_x$ sensor 255 is arranged to send continuously signals comprising information about a prevalent $NO_x$ level upstream of the SCR catalytic converter 270 to the first control unit 200.

A second $NO_x$ sensor 265 is arranged for communication with the first control unit 200 over a link L265. The second $NO_x$ sensor 265 is arranged to determine continuously a prevalent $NO_x$ level in the flow of exhaust gases downstream of the SCR catalytic converter 270. The second $NO_x$ sensor 265 is arranged to send continuously signals comprising information about a prevalent $NO_x$ level downstream of the said SCR catalytic converter 270 to the first control unit 200.

According to one design, at least one of the first control unit 200 and the second control unit 210 is configured to calculate the first $NO_x$ level upstream of the SCR catalytic converter 270. This can take place by means of a stored calculation model. At least one of the first control unit 200 and the second control unit 210 is arranged to calculate the first $NO_x$ level on the basis of, for example, a prevalent mass flow of exhaust gases, the prevalent rate of revolution of the engine or the prevalent load on the engine.

The first control unit 200 is configured to determine a prevalent degree of $NO_x$ conversion on the basis of the calculated or measured $NO_x$ level upstream of the SCR catalytic converter and the measured $NO_x$ level downstream of the SCR catalytic converter 270.

The first control unit 200 is arranged to determine the $NO_x$ level in the flow of exhaust gases downstream of the SCR catalytic converter 270. The first control unit 200 is arranged to determine the $NO_x$ level in the flow of exhaust gases upstream of the SCR catalytic converter 270. The first control unit 200 is arranged to achieve operating conditions at the SCR catalytic converter that are suitable for the purpose. The first control unit 200 is arranged to determine a prevalent degree of storage with respect to reducing agent in the SCR catalytic converter 270. The degree of storage can be determined on the basis of the calculated or measured $NO_x$ level upstream of the SCR catalytic converter 270 and the measured $NO_x$ level downstream of the SCR catalytic converter 270.

The first control unit 200 is arranged to determine continuously in a suitable manner a prevalent degree of storage with respect to reducing agent at the SCR catalytic converter 270. This may take place by means of a model stored in a memory in the first control unit 200. The first control unit 200 is arranged for communication with presentation means 280 over a link L280. The presentation means 280 may be arranged in a driver's cabin of the vehicle 100. The presentation means 280 may be fixed mounted in the vehicle 100. The presentation means 280 may be a mobile electronic unit. The presentation means 280 may include, for example, a display. The first control unit 200 is arranged to present an error code or other relevant information with respect to the innovative method. The first control unit 200 may be arranged to present by means of the presentation means 280 before switching off of the vehicle information about a prevalent degree of storage with respect to reducing agent in the SCR catalytic converter 270. In this case, an operator of the vehicle 100 can be instructed to drive the vehicle in a suitable manner in order to increase the degree of storage with respect to reducing agent in the SCR catalytic converter 270 before the switching off of the vehicle or engine 203.

The first control unit 200 is arranged for communication with the dosage unit 250 over a link L250. The first control unit 200 is arranged to control operation of the dosage unit 250 in order to, for example, regulate the supply of the reducer to the exhaust system of the vehicle 100.

The first control unit 200 is arranged to calculate a mass flow MF of exhaust gases from the engine of the vehicle. The first control unit 200 is arranged to determine continuously a mass flow MF of exhaust gases from the engine of the vehicle. This may take place in a suitable manner.

According to one design, the subsystem comprises a mass flow sensor (not shown in the drawings) that is arranged to measure continuously a prevalent mass flow of exhaust gases from the engine of the vehicle 100 in the exhaust passage 290 upstream of the SCR catalytic converter 270. The mass flow sensor is arranged to send continuously signals comprising information about a prevalent mass flow of exhaust gases to the first control unit over a link arranged for this purpose.

The first control unit 200 is arranged for communication with a third temperature sensor 285 over a link L285. The third temperature sensor 285 may be arranged to detect a prevalent temperature T3 of air in the surroundings of the vehicle 100. The third temperature sensor 285 may be arranged to detect a prevalent temperature T3 at a suitable location in the engine 203 or the vehicle 100. The third temperature sensor 285 is arranged to detect continuously a prevalent temperature T3 and to send signals comprising information about the prevalent temperature T3 over the link L285 to the first control unit 200.

A second control unit 210 is arranged for communication with the first control unit 200 over a link L210. The second control unit 210 may be connected to the first control unit 200 in a manner that allows it to be removed. The second control unit 210 may be a control unit that is external to the vehicle 100. The second control unit 210 may be arranged to carry out the innovative method steps according to the invention. The second control unit 210 may be used to transfer software over to the first control unit 200, in particular, software to carry out the innovative method. Alternatively, the second control unit 210 may be arranged for communication with the first control unit 200 over an internal network in the vehicle. The second control unit 210 may be arranged to carry out essentially the same functions as the first control unit 200, such as, for example, to control during cold start of an engine the dosage of fuel to the engine with a certain delay with respect to the case during essentially optimal combustion in order to reduce the development of heat that results from the combustion of fuel through non-optimal combustion.

Figure 3:
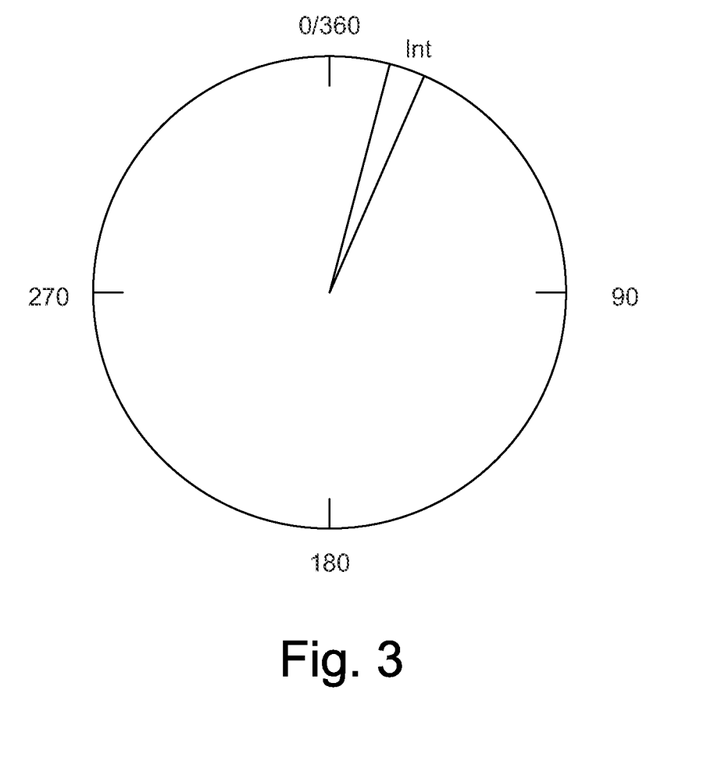
FIG. 3 illustrates schematically a drawing according to one aspect of the present invention.

FIG. 3 illustrates schematically a diagram that illustrates the crankshaft angle in an engine in a vehicle 100. The crankshaft angle is specified in degrees.

There is illustrated an interval Int during which dosage of fuel is dosed with a certain delay relative to the case during essentially optimal combustion.

During essentially optimal combustion, fuel is dosed to a cylinder in the engine essentially at angle 0. A higher level of NO gas is in this case achieved in a flow of exhaust gases from the cylinder.

During dosing that takes place with a certain delay with respect to what is the case during essentially optimal combustion, the heat that develops as a result of the combustion of fuel through non-optimal combustion can be reduced, whereby a lower level of NO gas in a flow of exhaust gases from the cylinder is achieved. According to one design, the delay is corresponded to by a crankshaft angle that lies within a suitable interval Int. The interval Int can be defined by a crankshaft angle of 10-15 degrees, for example, 12 degrees. The delay can, according to one design, be corresponded to by a crankshaft angle of 5-15 degrees. The delay can, according to one design, be corresponded to by a crankshaft angle of 15-20 degrees, for example, 18 degrees. The delay can, according to one design, be corresponded to by a crankshaft angle of 8-12 degrees, for example, 10 degrees.

Figure 4A:
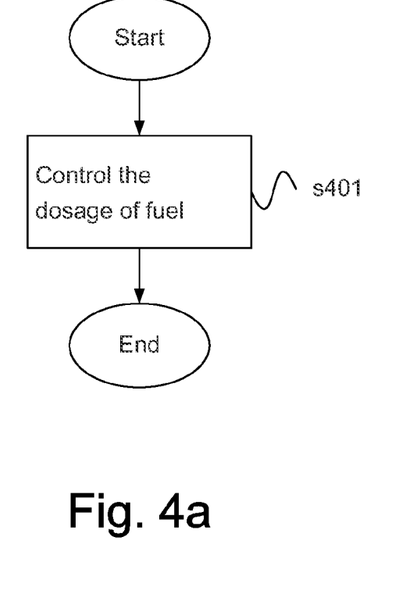
FIG. 4a illustrates schematically a flow diagram of a method according to one embodiment of the invention.

FIG. 4a illustrates schematically a flow chart of a method to reduce, during the start of an engine comprising at least one cylinder with its associated piston, undesired emissions from the engine, according to one embodiment of the invention. The method comprises a first method step s401, which comprises:

to control the dosage of fuel to the engine; and
to control the dosage of fuel to the engine with a certain delay relative to the case during essentially optimal combustion in order to reduce the development of heat that results from the combustion of fuel through non-optimal combustion. The start of the engine may be a cold start of the engine. The method is terminated after the step s401.

Figure 4B:
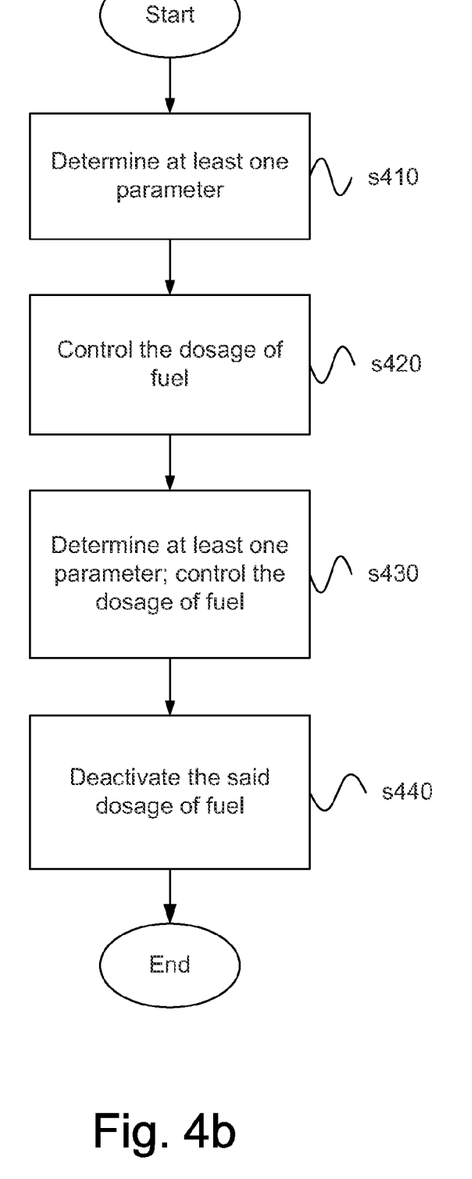
FIG. 4b illustrates schematically in greater detail a flow diagram of a method according to one embodiment of the invention.

FIG. 4b illustrates schematically a flow chart of a method, during start of an engine comprising at least one cylinder with its associated piston, to reduce undesired emissions from the engine, where an SCR catalytic converter for the cleaning of exhaust gases is arranged in an exhaust passage of the engine, according to one embodiment of the invention. The start of the engine may be a cold start of the engine.

The method comprises a first method step s410. The method step s410 may include the step of continuously determining at least one parameter.

The parameter may concern a prevalent ambient temperature. This can take place by means of suitable devices. This can take place by means of the third temperature sensor 285, which is arranged to measure an ambient temperature at at least one of the engine 203 and the vehicle 100. It can in this case be determined whether the start of the engine 203 is to be denoted as a cold start or not. A temperature that lies below 0 degrees Celsius can be regarded to be associated with a cold start.

The parameter may concern a prevalent temperature of exhaust gases from the engine 203. This can take place by means of a suitable device, such as the first temperature sensor 240. It can in this case be determined whether the start of the engine 203 is to be denoted as a cold start or not. A temperature that lies below 0 degrees Celsius can be regarded to be associated with a cold start.

The parameter may concern a prevalent temperature at a component of the exhaust passage 290 or a surface at the exhaust passage 290. This can take place by means of a suitable device, such as the second temperature sensor 260. It can in this case be determined whether the start of the engine 203 is to be denoted as a cold start or not. A temperature that lies below 0 degrees Celsius can be regarded to be associated with a cold start.

The parameter may concern a degree of storage with respect to reducing agent in the SCR catalytic converter 270. The degree of storage with respect to reducing agent in the SCR catalytic converter 270 can be determined as a basis for controlling at least one of a delay of the dosage of fuel and activation of the dosage of fuel with a certain delay.

If it is determined that the start of the engine 203 is taking place as a cold start, a subsequent method step s420 is carried out. If it is determined that the start of the engine 203 is taking place not as a cold start, the method is interrupted.

If it is determined that the prevalent degree of storage with respect to reducing agent in the SCR catalytic converter 270 exceeds a certain pre-determined level, the method is interrupted. If it is determined that the prevalent degree of storage with respect to reducing agent in the SCR catalytic converter 270 lies below the pre-determined level, the subsequent method step s420 is carried out. The pre-determined value may be, for example, 25% or 50%.

The method step s420 includes the step of controlling the dosage of fuel to the engine 203 with a certain delay relative to what occurs during essentially optimal combustion in order to reduce the production of heat that results from the combustion of fuel through non-optimal combustion. The delay may be a suitable delay, for example 10 or 15 degrees at a crankshaft of the engine 203. The step s420 may include the deactivation of an exhaust brake at the engine 203. After the method step s420, a subsequent method step s430 is carried out.

The method step s430 may include the step of determining continuously at least one of a prevalent temperature at the SCR catalytic converter 270 and a prevalent temperature of the exhaust gases from the engine 203.

The method step s430 may include the step of determining continuously a prevalent degree of storage with respect to reducing agent in the SCR catalytic converter 270.

The method step s430 may furthermore include the step of controlling the delay on the basis of at least one of a prevalent temperature at the SCR catalytic converter and a prevalent temperature of the exhaust gases from the engine 203. The higher the temperature that is present at the said catalytic converter 270, the shorter can be the delay of dosage of fuel in a cylinder at the engine. In this case, the operation of the engine may take place at an operating condition that is more optimal with respect to fuel than is the case at a lower temperature, which and this achieves environmental advantages.

The method step s430 may furthermore include the step of controlling the delay on the basis of a prevalent degree of storage with respect to reducing agent in the SCR catalytic converter 270. The higher the degree of storage with respect to reducing agent that is present at the SCR catalytic converter 270, the shorter can be the delay of dosage of fuel in a cylinder at the engine. A higher degree of storage of reducing agent in the SCR catalytic converter 270 influences a degree of conversion therein in a positive manner, whereby a reduction in undesired emissions is achieved compared with what is achieved at a lower degree of storage.

After the method step s430, a subsequent method step s440 is carried out.

The method step s440 can include the step of deactivating the dosage of fuel with a certain delay at at least one of a pre-determined temperature at the SCR catalytic converter 270 and a pre-determined temperature of a flow of exhaust gases from the engine 203. According to one example, the pre-determined temperature can be 40 degrees Celsius. The step s440 may include the activation of an exhaust brake at the engine 203. The method is terminated after the method step s440.

Figure 5:
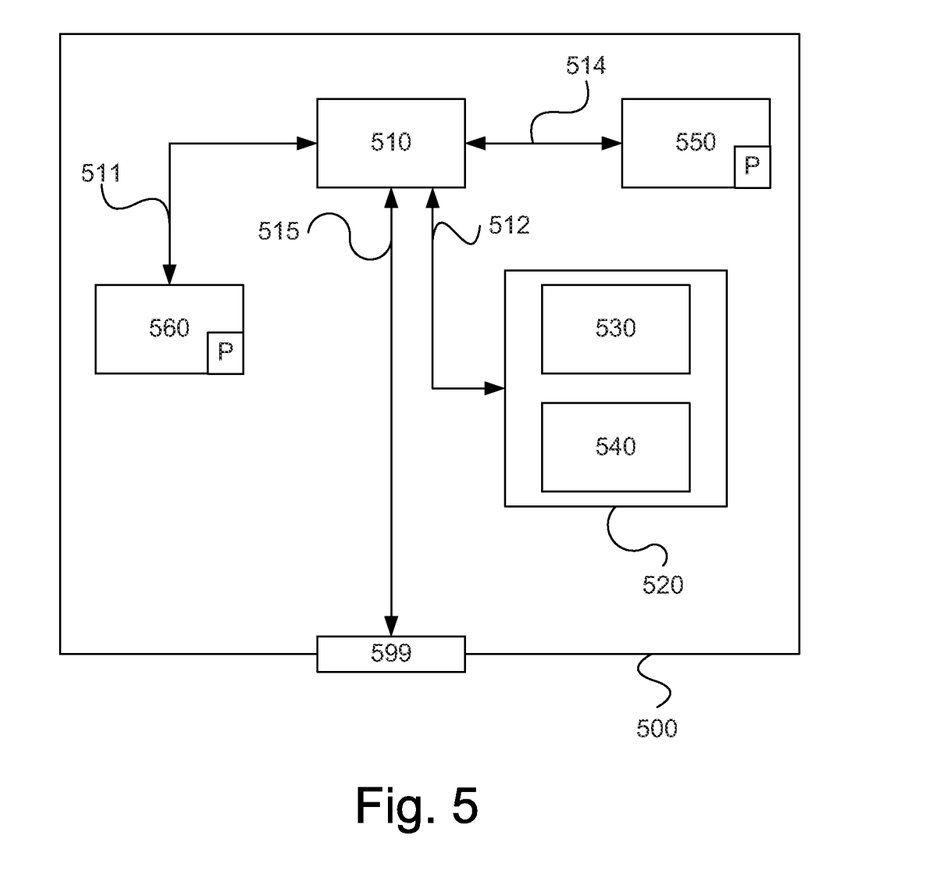
FIG. 5 illustrates schematically a computer according to one embodiment of the invention.

With reference to FIG. 5, there is shown a drawing of a design of an arrangement 500. The control units 200 and 210 that are described with reference to FIG. 2 may, in one design, comprise the arrangement 500. The arrangement 500 comprises a non-transient memory 520, a data processing unit 510 and a read/write memory 550. The non-transient memory 520 has a first section of memory 530 in which a computer program, such as an operating system, is stored in order to control the function of the arrangement 500. Furthermore, the arrangement 500 comprises a bus controller, a serial communication port, I/O means, an A/D converter, a unit for the input and transfer of time and date, an event counter and an interrupt controller (not shown in the drawing). The non-transient memory 520 has also a second section of memory 540.

There is provided a computer program P that may comprise routines to reduce during the cold start of an engine 203 that comprises at least one cylinder and its associated piston undesired emissions from the engine 203, where an SCR catalytic converter 270 for the cleaning of exhaust gases is present in an exhaust passage 290 at the engine 203. The computer P may comprise routines to control the dosage of fuel to the engine 203. The computer program P may include routines to control the dosage of fuel to the engine 203 with a certain delay relative to what is the case during essentially optimal combustion in order to reduce the production of heat that results from the combustion of fuel through non-optimal combustion. The computer program P may comprise routines for activating the dosage of fuel with a certain delay after a completed starting mode of the engine 203. The computer program P may comprise routines for deactivating the dosage of fuel with a certain delay at at least one of a pre-determined temperature at the SCR catalytic converter 270 and a pre-determined temperature of a flow of exhaust gases from the engine 203. The computer program P may comprise routines for determining a current degree of storage with respect to reducing agent at the SCR catalytic converter 270 as a basis for controlling the delay and the activation of the dosage of fuel with a certain delay. The computer program P may comprise routines to activate and deactivate, where appropriate, an exhaust brake. The computer program P may comprise routines to control the dosage of fuel with a certain delay in the absence of an activated exhaust brake. The computer program P may comprise routines for controlling the delay on the basis of at least one of a prevalent temperature at the SCR catalytic converter and a prevalent temperature of the exhaust gases from the engine 203.

The program P may be stored in an executable form or in a compressed form in at least one of a memory 560 and a read/write memory 550.

When it is described that the data processing unit 510 carries out a certain function, it is to be understood that the data processing unit 510 carries out a certain part of the program that is stored in the memory 560, or a certain part of the program that is stored in the read/write memory 550.

The data processing arrangement 510 can communicate with a data port 599 through a data bus 515. The non-transient memory 520 is intended for communication with the data processing unit 510 through a data bus 512.

The separate memory 560 is intended to communicate with the data processing unit 510 through a data bus 511. The read/write memory 550 is configured to communicate with the data processing unit 510 through a data bus 514. The links L210, L230, L240, L250, L255, L260, L265, L280 and L285 can, for example, be connected to the data part 599 (see FIG. 2).

When data is received at the data port 599, it is temporarily stored in the second section of memory 540. When the data that has been received has been temporarily stored, the data processing unit 510 is prepared for the execution of code in a manner that has been described above.

According to one design, signals received at the data port 599 comprise information about the $NO_x$ level upstream of the SCR catalytic converter 270. According to one design, signals received at the data port 599 comprise information about the $NO_x$ level downstream of the SCR catalytic converter 270. According to one design, signals received at the data port 599 comprise information about a prevalent temperature of the exhaust gases upstream of the SCR catalytic converter 270. According to one design, signals received at the data port 599 comprise information about a prevalent temperature at a suitable surface at, or a component at the exhaust passage 290, for example a temperature at the SCR catalytic converter 270. According to one design, signals received at the data port 599 comprise information about a prevalent ambient temperature at the engine 203 or vehicle 100.

The signals received at the data port can be used by the arrangement 500 to carry out the method according to the invention.

Parts of the methods described here may be carried out by the arrangement 500 with the aid of the data processing unit 510, which runs the program stored in the memory 560 or in the read/write memory 550. When the arrangement 500 runs the program, the method described here is executed.

The previous description of the preferred embodiments of the present invention has been provided for the purposes of illustration and description of the invention. It is not intended to be exhaustive or to limit the invention to the variants that have been described. Many modifications and variations will be obvious for one skilled in the arts. The embodiments were selected and described in order to best explain the principles of the invention and its practical applications, and thus to make it possible for those skilled in the arts to understand the invention for various embodiments and with the various modifications that are appropriate for the intended use.

The invention claimed:

1. A method performed during a start of an engine, the engine comprising at least one cylinder with its associated piston, to reduce undesired emissions from the engine, and a SCR catalytic converter for the cleaning of exhaust gases is arranged in an exhaust passage at the engine, the method comprising:
   during the start of the engine, determining a temperature of the SCR catalytic converter;
   setting a set length of a certain delay in a dosage of a fuel to the engine based on the temperature of the SCR catalytic converter;
   activating the dosage of the fuel by applying the certain delay for the set length in the dosage of the fuel, relative to a dosing when a crankshaft angle is 0 degrees, to reduce development of heat that results from combustion of the fuel; and
   deactivating the dosage of the fuel with the certain delay when the temperature of the SCR catalytic converter is above a pre-determined temperature,
   wherein the pre-determined temperature is to reduce or to minimize a risk that yellow smoke or brown smoke is emitted from the SCR catalytic converter.

2. The method according to claim 1, wherein the pre-determined temperature is 50 degrees Celsius.

3. The method according to claim 1, wherein the dosage of the fuel to the engine is controlled with the certain delay at least in the temperature in range of 20-40 degrees Celsius.

4. The method according to claim 3, wherein the dosage of the fuel in case of the certain delay takes place at a pre-determined crankshaft angle.

5. The method according to claim 4, wherein the pre-determined crankshaft angle lies within an interval of 10-15 degrees compared with the crankshaft angle of 0 degrees.

6. The method according to claim 1, comprising:
   determining a prevalent degree of storage of reducing agent at the SCR catalytic converter and, based on the prevalent degree of storage, setting the set length of the delay.

7. The method according to claim 1, wherein the dosage of the fuel with the certain delay takes place in absence of an activated exhaust brake at the engine.

8. The method according to claim 1, comprising:
   controlling an effect of an exhaust brake based on at least one of the temperature of the SCR catalytic converter or a prevalent degree of a storage with respect to a reducing agent in the SCR catalytic converter.

9. The method according to claim 8, comprising:
   activating the exhaust brake at a the pre-determined temperature of the SCR system catalytic converter or based on the prevalent degree of the storage with respect to the reducing agent in the SCR catalytic converter.

10. The method according to claim 9,
   wherein the pre-determined temperature of the SCR catalytic converter is greater than or equal to 40 degrees Celsius.

11. The method according to claim 1, wherein the set length of the certain delay is set based on conversion conditions in the SCR catalytic converter.

12. An arrangement operative during a start of an engine, the engine comprising at least one cylinder with an associated piston, to reduce undesired emissions from the engine, the arrangement comprising:
   a SCR catalytic converter for cleaning exhaust gases arranged in an exhaust passage at the engine;
   at least one temperature sensor for determining temperature of the SCR catalytic converter; and
   an ECU configured:
   during the start of the engine, to determine a temperature of the SCR catalytic converter;
   to set a set length of a certain delay in a dosage of a fuel to the engine based on the temperature of the SCR catalytic converter;
   to activate the dosage of the fuel by applying the certain delay for the set length in the dosage of the fuel, relative to a dosing when a crankshaft angle is 0 degrees, to reduce development of heat that results from combustion of the fuel; and
   to deactivate the dosage of the fuel with the certain delay when the temperature of the SCR catalytic converter is above a pre-determined temperature,
   wherein the pre-determined temperature is to reduce or to minimize a risk that yellow smoke or brown smoke is emitted from the SCR catalytic converter.

13. A motor vehicle comprising an engine and an arrangement according to claim 12.

14. The motor vehicle according to claim 13, wherein the motor vehicle is any one of a truck, bus or car.

15. The arrangement of claim 12, wherein the set length of the certain delay is set based on conversion conditions in the SCR catalytic converter.

* * * * *